(12) United States Patent
Mayfield et al.

(10) Patent No.: US 6,735,437 B2
(45) Date of Patent: May 11, 2004

(54) COMMUNICATION SYSTEM EMPLOYING REUSE OF SATELLITE SPECTRUM FOR TERRESTRIAL COMMUNICATION

(75) Inventors: William W. Mayfield, Torrance, CA (US); Donald C. D. Chang, Thousand Oaks, CA (US); John I. Novak, III, West Hills, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 170 days.

(21) Appl. No.: 09/105,622

(22) Filed: Jun. 26, 1998

(65) Prior Publication Data

US 2003/0078040 A1 Apr. 24, 2003

(51) Int. Cl.[7] .................................................. H04Q 7/20
(52) U.S. Cl. ........................ 455/427; 455/12.1; 455/447
(58) Field of Search .................................. 455/427, 429, 455/430, 11.1, 12.1, 13.2, 447, 444; 370/311, 318, 320, 330, 348, 433; 342/352

(56) References Cited

U.S. PATENT DOCUMENTS

| | | | |
|---|---|---|---|
| 5,444,762 A | 8/1995 | Frey et al. | |
| 5,483,663 A | 1/1996 | Tawil | |
| 5,511,233 A * | 4/1996 | Otten | 455/524 |
| 5,557,656 A | 9/1996 | Ray et al. | |
| 5,584,046 A * | 12/1996 | Martinez et al. | 455/13.2 |
| 5,734,678 A * | 3/1998 | Paneth et al. | 370/330 |
| 5,754,536 A * | 5/1998 | Schmidt | 370/330 |
| 5,761,605 A | 6/1998 | Tawil et al. | |
| 5,848,060 A * | 12/1998 | Dent | 370/319 |
| 5,884,166 A | 3/1999 | Ray et al. | |
| 5,915,217 A * | 6/1999 | Wiedeman et al. | 455/427 |
| 5,937,332 A * | 8/1999 | Karabinis | 455/12.1 |
| 5,991,279 A * | 11/1999 | Haugli et al. | 370/311 |
| 6,108,539 A | 8/2000 | Ray et al. | |
| 6,169,878 B1 | 1/2001 | Tawil et al. | |
| 6,208,636 B1 | 3/2001 | Tawil et al. | |
| 6,208,834 B1 | 3/2001 | Tawil et al. | |
| 6,233,456 B1 * | 5/2001 | Schiff et al. | 455/436 |
| 6,408,180 B1 | 6/2002 | McKenna et al. | |

* cited by examiner

Primary Examiner—Nay Maung
Assistant Examiner—Jean A Gelin
(74) Attorney, Agent, or Firm—V. D. Duraiswamy; M. W. Sales

(57) ABSTRACT

A terrestrial communication system using satellite uplink and downlink frequencies is disclosed. A terrestrial cell site produces a signal at a satellite uplink frequency that is transmitted to a terrestrial user terminal. The terrestrial cell site receives a signal at a satellite downlink frequency that was transmitted by a terrestrial user terminal. The terrestrial cell site may include a signal nulling means in the direction of a satellite producing signals at the uplink and downlink frequencies.

129 Claims, 1 Drawing Sheet

COMMUNICATION SYSTEM EMPLOYING REUSE OF SATELLITE SPECTRUM FOR TERRESTRIAL COMMUNICATION

BACKGROUND OF THE INVENTION (a) Field of the Invention

This invention relates generally to a communications system and method wherein multiple communication systems are integrated into a common allocated radio frequency spectrum. More particularly, it relates to a communications system and method that integrates a terrestrial communication system into the radio frequency spectrum allocated to a mobile satellite communication system.

(b) Description of Related Art

Terrestrial communication services such as voice cellular and Personal Communication Systems (PCS) transmit information within a narrow spectrum surrounding nominal frequencies of 900 MHZ and 2 GHz respectively. The available spectra for such terrestrial communications are scarce and expensive. To operate their businesses profitably, companies providing these terrestrial communication services must maximize the number of users on their allocated frequency spectrum. This is accomplished by first sub-dividing the allocated spectrum into numerous spectra or frequency bands, and then sub-dividing large geographic areas into numerous spatially isolated communication cells. Thus, each cell can support numerous users on its multiple frequency bands, and reuse of these frequency bands across cells permits multiple users to use the same frequency band as long as they are in spatially isolated cells.

Mobile Satellite Service (MSS) providers such as the American Mobile Satellite Corporation (AMSC) provide satellite communication services through networks of mobile satellites in geosynchronous earth orbit (GEO). Other MSS providers operate satellite networks in medium earth orbit (MEO), and low earth orbit (LEO). The Federal Communications Commission (FCC) has allocated a 34 MHZ spectrum within the L-band (at ≈1.5 GHz) for use in mobile satellite communications. MSS providers share this 34 MHZ spectrum globally. As with the terrestrial communication providers, MSS providers can improve their profitability by maximizing the number of users on their allocated frequency spectrum. Traditionally, this has been accomplished using specific antenna designs and locations that provide spatial or geographic isolation and then reusing frequency bands across the isolated areas.

Thus, there is a need for a system and method of integrating multiple communication systems into a common allocated radio frequency spectrum. More specifically, there is a need for a system and method that integrates a terrestrial communication system into the radio frequency spectrum allocated to a mobile satellite communication system.

SUMMARY OF THE INVENTION

In accordance with one aspect of the present invention, a terrestrial communication system comprises a terrestrial cell site that produces a signal at a satellite uplink frequency and transmits it to a terrestrial user terminal, and that receives a signal at a satellite downlink frequency that was transmitted by a terrestrial terminal unit.

In accordance with another aspect of the present invention, a terrestrial communication system comprises a terrestrial terminal unit that produces a signal at a satellite downlink frequency and transmits it to a terrestrial cell site, and that receives a signal at a satellite uplink frequency that was transmitted by a terrestrial cell site.

In accordance with yet another aspect of the present invention, a method of integrating a terrestrial communication system into a satellite communication frequency spectrum comprises the following steps: a) producing a signal at a satellite uplink frequency that is transmitted from a terrestrial cell site to a terrestrial user terminal, and b) receiving a signal at a satellite downlink frequency that was produced by said terrestrial user terminal and transmitted to a terrestrial cell site.

The invention itself, together with further objects and attendant advantages, will best be understood by reference to the following detailed description, taken in conjunction with the accompanying drawings.

DESCRIPTION OF THE PREFERRED EMBODIMENTS

Figure 1:
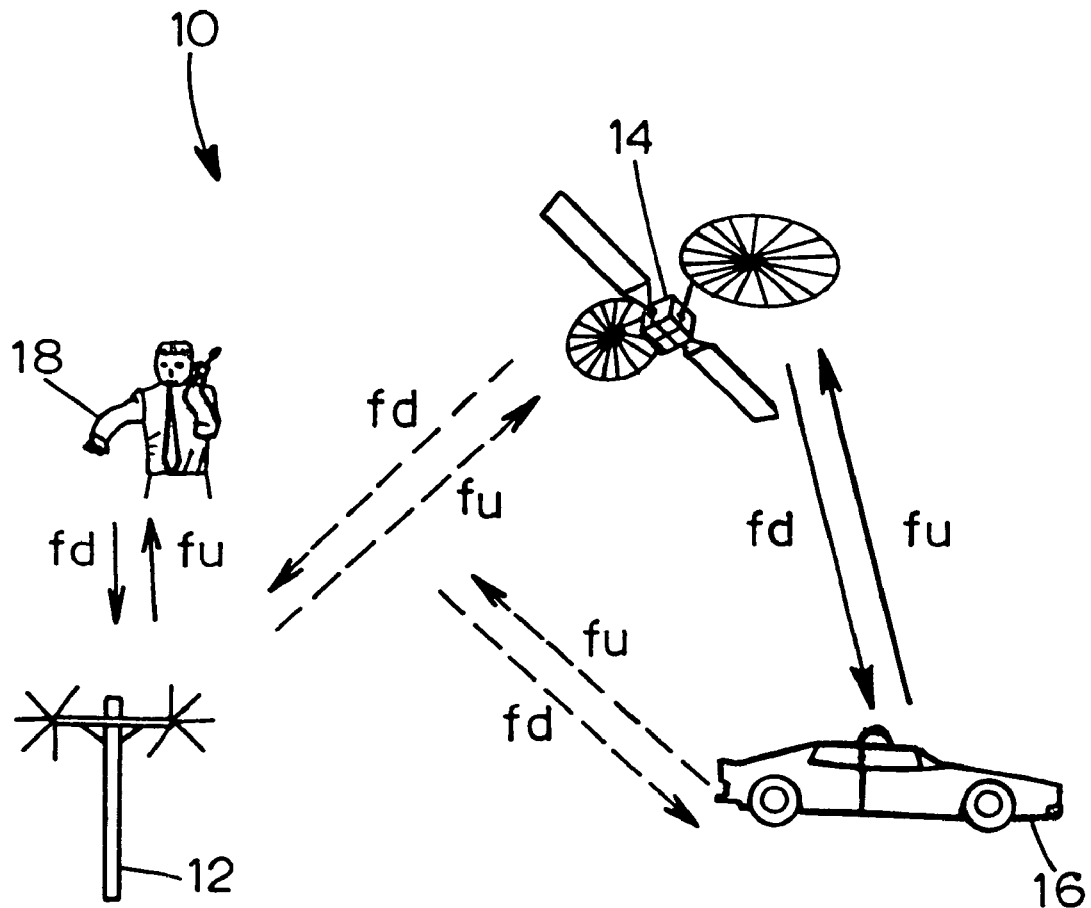
FIG. 1 is a system level diagram of a terrestrial communication system according to a preferred embodiment of the present invention.

It is highly desirable to develop a system and method for integrating a terrestrial communication system into the radio frequency spectrum allocated to a mobile satellite communication system so that MSS providers can expand their business to include millions of potential terrestrial customers. Such an expanded customer base would substantially increase an MSS provider's profitability by allowing greater utilization of their allocated spectrum.

MSS providers have been unable to integrate terrestrial communication services into their allocated frequency spectrum because conventional systems and methods of reusing frequency bands would produce intolerable levels of mutual interference. There are several difficulties inherent in integrating a terrestrial communications system into an existing satellite communication system. First, a satellite beam covers a large geographic area which could include a large number of terrestrial communication cells. Thus, a large number of terrestrial users could generate an intolerable level of aggregate interference on the satellite uplink frequency bands. Second, satellite downlink interference could impinge on a large group of terrestrial users within the scope of the satellite's beam. Third, eliminating or minimizing these interferences would require incorporation of special electronic filtering and directional antennas into a variety of hand-held terrestrial user terminals. Such design modifications are not practical because of the need for mobility, small size, and low cost in these units.

The present invention overcomes these difficulties by reversing the transmission and reception frequency bands for the terrestrial user relative to the satellite user in combination with modification of terrestrial cell site antennas to include pattern nulls in the direction of mobile satellites.

FIG. 1 shows one preferred embodiment for the present invention. The system 10 depicted in FIG. 1 reverses the transmission and reception frequency bands of the terrestrial communication system, represented by cell site 12, with respect to the satellite communication system represented by satellite 14. Terrestrial user terminals 18 transmit on the satellite system's downlink frequency ($f_d$) and receive communications on the satellite system's uplink frequency ($f_u$). This relative reversal of frequency bands shifts potential interference paths so that their impact can be more easily minimized or eliminated.

With the present invention, interference between the large number of terrestrial users and satellites has been completely eliminated. Additionally, interference between cell sites and satellite ground users has been completely eliminated.

The system shown in FIG. 1 creates four potential interference paths: (1) terrestrial cell site transmission can interfere with satellite uplinks, (2) satellite transmissions can interfere with cell site reception, (3) terrestrial user terminal transmissions can interfere with satellite ground user reception, and (4) satellite ground user transmissions can interfere with terrestrial user terminal reception. Using the disclosed system, mutual interference paths have shifted, and exist between terrestrial users 18 and ground satellite users 16, and also between cell sites 12 and satellites 14.

Mutual interference between terrestrial users 18 and satellite users 16 is easily minimized to tolerable levels through geographic isolation of frequency reuse. MSS providers are typically allocated multiple uplink and multiple downlink frequency bands. Assigning frequency bands so that terrestrial users 18 and ground satellite users 16 within the same geographic region are using different uplink and downlink bands minimizes the potential for interference within a region.

Mutual interference between cell sites 12 and satellites 14 is reduced to tolerable levels by adding pattern nulls to terrestrial cell site antennas. Adding pattern nulls to cell site antennas that block satellite interference will not ordinarily impair the quality of terrestrial communications because the desired radiation pattern for cell sites is predominantly horizontal. Furthermore, the additional cost of these cell site pattern nulls will not be prohibitive since there are relatively few cell site installations for a large number of terrestrial users.

Terrestrial user cell site antennas can be designed with high gain in the horizontal directions and with fixed nulls towards satellite directions. For example, simple sidelobe canceling techniques result in a 10 dB to 20 dB gain in the desired direction for terrestrial communications, and a −35 dB to −55 dB attenuation in the mobile satellite directions. More complex nulling techniques may be used to further improve the discrimination of the cell site antennas. For example, low gain elements may be added to the main antenna elements. Each low gain element would provide an independent null in an interference direction, and their amplitudes and phases can be adjusted so that they add destructively.

Low gain elements tend to produce narrow band nulls in a given direction. Wide band nulls can be formed to cover both the transmit and receive frequency bands (about 1 GHz separation) by using multiple low gain elements for each interference direction, or by using multiple taps on a single low gain element to produce nulls at multiple frequencies. Cost considerations will favor a multiple tap approach for low bandwidth digital applications, and the extra element approach for high bandwidth analog applications.

Of course, it should be understood that a range of changes and modifications can be made to the preferred embodiment described above. For example, more complex weighting control of the signals from the various antenna elements can be used to further improve the discrimination of terrestrial cell site antennas. Nulls of −30 dB can be achieved with a control resolution of 8 bits. Finally, a dynamic adjustment of the antenna nulls would permit the application of the present invention to satellites that are not in geosynchronous orbit. Dynamic control of the null signal weighting using a table look-up can be accomplished within a simple closed loop feedback system employing a steepest descent search algorithm and a least-mean-square as the optimization criteria. Thus, MSS providers having MEO and LEO satellite networks would thereby benefit by being able to use their allocated frequency spectrum in terrestrial applications.

It is therefore intended that the foregoing detailed description be regarded as illustrative rather than limiting and that it be understood that it is the following claims, including all equivalents, which are intended to define the scope of this invention.

What is claimed is:

1. A terrestrial communication system using satellite uplink and downlink frequencies comprising:
   a terrestrial cell site producing a first signal at a satellite uplink frequency that is transmitted directly to a terrestrial terminal unit, and
   said terrestrial cell site directly receiving a second signal at a satellite downlink frequency that was transmitted by said terrestrial terminal unit.

2. The terrestrial communication system of claim 1, wherein said terrestrial cell site includes a signal nulling means in the direction of a satellite that produces signals using said uplink and said downlink frequencies.

3. A terrestrial communication system using satellite uplink and downlink frequencies comprising:
   a terrestrial terminal unit producing a first signal at a satellite downlink frequency that is transmitted directly to a terrestrial cell site, and
   said terrestrial terminal unit receiving a second signal at a satellite uplink frequency that was transmitted directly by said terrestrial cell site.

4. The terrestrial communication system of claim 3, wherein a satellite ground user using said uplink and said downlink frequencies is geographically isolated from said terrestrial terminal unit.

5. A method of integrating a terrestrial communication system into a satellite communication frequency spectrum comprising:
   producing a first signal at a satellite uplink frequency that is transmitted directly from a terrestrial cell site to a terrestrial user terminal, and
   receiving a second signal at a satellite downlink frequency that was produced by said terrestrial user terminal and transmitted directly to said terrestrial cell site.

6. A method of providing terrestrial communication services, comprising:
   using a first signal at a satellite uplink frequency that is transmitted from a terrestrial source to a terrestrial user terminal, and
   using a second signal at a satellite downlink frequency that is transmitted from the terrestrial user terminal to the terrestrial source.

7. A method of providing terrestrial communications comprising:
   transmitting a first signal at a satellite uplink frequency to a terrestrial user terminal from a terrestrial site; and
   transmitting a second signal at a satellite downlink frequency from the terrestrial user terminal to the terrestrial site.

8. A method for minimizing interference between a satellite communication system and a terrestrial communication system without a satellite, having at least one terrestrial site and reusing satellite frequencies, comprising:
   reversing the transmission and reception frequency bands for the terrestrial communication system relative to the satellite communication system; and generating at least one pattern null with an antenna at the at least one terrestrial site to reduce satellite interference.

9. The method of claim 8, wherein generating at least one pattern null further comprises generating a fixed null towards a satellite direction and a relatively high gain in the horizontal direction.

10. The method of claim 8, wherein generating at least one pattern null comprises utilizing a sidelobe cancellation technique.

11. The method of claim 8, wherein generating at least one pattern null comprises using weighting control of signals from antenna elements.

12. The method of claim 8, wherein generating at least one pattern null comprises using a nulling technique.

13. The method of claim 8, wherein said antenna comprises antenna elements and wherein the step generating at least one pattern null comprises using at least one low gain element added to the antenna elements.

14. The method of claim 8, wherein generating at least one pattern null comprises creating an independent null in an interference direction and adjusting said at least one low gain element to add amplitudes and phases destructively.

15. The method of claim 8, wherein generating at least one pattern null comprises adding wide band nulls using multiple low gain elements.

16. The method of claim 15, wherein said at least one of said multiple low gain elements has multiple taps to produce nulls at multiple frequencies.

17. The method of claim 8, adding at least one pattern null includes dynamically adjusting the at least one pattern null.

18. The method of claim 17, wherein dynamically adjusting comprises dynamically adjusting the at least one pattern null using a table-look-up.

19. The method of claim 18, wherein using a table lookup comprises using said look-up table within a closed loop feedback system and employing a steepest descent search algorithm and a least-mean-square as the optimization criteria.

20. A terrestrial communication system comprising:
a terrestrial source; and
a terrestrial user terminal;
said terrestrial source transmitting a first signal at a satellite uplink frequency to said terrestrial user terminal and receiving a second signal transmitted from said terrestrial user terminal at a satellite downlink frequency and said terrestrial user terminal for receiving the first signal at the satellite uplink frequency and transmitting the second signal at the satellite downlink frequency without satellite interference.

21. A terrestrial communication system that reuses satellite frequencies used by a satellite communication system without satellite interference comprising:
a terrestrial site communicating with a terrestrial user terminal using transmission and reception frequency bands that are reversed relative to the satellite communication system, and having at least one antenna with at least one pattern null in at least one satellite direction to block satellite interference.

22. The system of claim 21, wherein said at least one antenna has a fixed null towards a satellite direction and comparatively high gain in the horizontal direction.

23. The system of claim 21, wherein said at least one antenna has sidelobe cancellation used to create the at least one pattern null.

24. The system of claim 21, wherein said at least one antenna comprises a plurality of elements and weighting control to create the at least one pattern null.

25. The system of claim 21, further comprising at least one low gain element, said at least one antenna comprising a plurality of the elements and the at least one low gain element.

26. The system of claim 25, wherein said at least one antenna has an independent null in an interference direction and said at least one low gain element adds amplitudes and phases destructively.

27. The system of claim 25, wherein said at least one low gain element has multiple taps to produce nulls at multiple frequencies.

28. The system of claim 21, wherein said at least one antenna comprises multiple low gain elements for wide band null creation.

29. The system of claim 21, further comprising means for dynamic adjustment of the at least one pattern null.

30. The system of claim 21, further comprising a table-look-up for dynamic adjustment of the at least one pattern null.

31. The system of claim 30, further comprising a closed loop feedback system employing a steepest descent search algorithm and a least-mean-square as the optimization criteria.

32. A terrestrial communication system integrated with and operable using radio frequency spectrum allocated to a satellite communication system having satellites comprising:
at least one terrestrial cell site communicating with at least one terrestrial terminal user, directly without using said satellites, using transmission and reception frequency bands that are reversed relative to the satellite user, said at least one terrestrial cell site having at least one antenna with a pattern null in the direction of the satellite.

33. The system of claim 32, wherein the pattern null of the at least one antenna includes a fixed null towards a satellite direction and comparatively high gain in the horizontal direction.

34. The system of claim 32, wherein sidelobe cancellation is used to create the pattern nulls.

35. The system of claim 32, wherein weighting control of the signals from the antennas is used to create the pattern null.

36. The system of claim 32, wherein nulling is used to create the pattern nulls.

37. The system of claim 32, further comprising at least one low gain element coupled to said at least one antenna.

38. The system of claim 37, wherein said at least one antenna has independent nulls in interference directions and said at least one low gain element adds amplitudes and phases destructively.

39. The system of claim 37, wherein said at least one low gain element has multiple taps to produce nulls at multiple frequencies.

40. The system of claim 32, further comprising multiple low gain elements for wide band null creation.

41. The system of claim 38, further comprising means for dynamically adjusting the pattern nulls.

42. The system of claim 38, further comprising a table-look-up for dynamic adjustment of the pattern nulls.

43. The system of claim 42, further comprising a closed loop feedback system employing a steepest descent search algorithm and a least-mean-square as an optimization criteria.

44. The system of claim 32, wherein said satellites comprise mobile satellites.

45. A communication system comprising:
- a satellite producing downlink signals at a satellite downlink frequency and receiving uplink signals at a satellite uplink frequency;
- a plurality of terrestrial terminal units;
- a terrestrial cell site;
- at least one of said terrestrial terminal units producing a first signal at the satellite downlink frequency that is transmitted directly to said terrestrial cell site;
- at least one of said terrestrial terminal units receiving a second signal at a satellite uplink frequency that was transmitted directly by said terrestrial cell site;
- said terrestrial cell site producing a third signal at the satellite uplink frequency that is transmitted directly to at least one of said terrestrial terminal units; and
- said terrestrial cell site directly receiving a fourth signal at the satellite downlink frequency that was transmitted by at least one of said terrestrial terminal units.

46. The system of claim 45, wherein said fourth signal is said first signal.

47. The system of claim 45, wherein said third signal is said second signal.

48. The system of claim 45, wherein said terrestrial cell site produces a fifth signal at the satellite uplink frequency that is transmitted to the satellite; and
- said terrestrial cell site receives a sixth signal at the satellite downlink frequency that was transmitted by the satellite.

49. The system of claim 45, wherein said terrestrial terminal unit produces a seventh signal at the satellite uplink frequency that is transmitted to the satellite; and
- said terrestrial terminal unit receives a sixth signal at the satellite downlink frequency that was transmitted by the satellite.

50. The system of claim 45, wherein said terrestrial cell site further comprises at least one antenna.

51. The system of claim 50, wherein said at least one antenna has a fixed null towards a satellite direction and comparatively high gain in the horizontal direction.

52. The system of claim 50, wherein said at least one antenna has sidelobe cancellation used to create the at least one pattern null.

53. The system of claim 52, wherein said at least one antenna comprises a plurality of elements and weighting control to create the at least one pattern null.

54. The system of claim 50, further comprising at least one low gain element, said at least one antenna comprising a plurality of the elements and the at least one low gain element.

55. The system of claim 54, wherein said at least one antenna has an independent null in an interference direction and said at least one low gain element adds amplitudes and phases destructively.

56. The system of claim 54, wherein said at least one low gain element has multiple taps to produce nulls at multiple frequencies.

57. The system of claim 54 further comprising multiple low gain elements for wide band null creation.

58. The system of claim 50 further comprising means for dynamic adjustment of the at least one pattern null.

59. The system of claim 50, further comprising a table-look-up for dynamic adjustment of the at least one pattern null.

60. The system of claim 50, further comprising a closed loop feedback system employing a steepest descent search algorithm and a least-mean-square as an optimization criteria.

61. The system of claim 50 wherein a satellite user is geographically isolated from a terrestrial user.

62. A communication system comprising:
- a satellite operable using an allocated radio frequency spectrum;
- a satellite user terminal communicating with said satellite using an uplink frequency and a downlink frequency;
- at least one terrestrial cell site communicating with at least one terrestrial terminal unit using transmission and reception frequency bands that are reversed relative to the allocated radio frequency spectrum of said satellite, said at least one terrestrial cell site having at least one antenna.

63. The system of claim 62, wherein said at least one terrestrial cell site communicates with said satellite using said uplink frequency and said downlink frequency.

64. The system of claim 62, wherein said terrestrial cell site further comprises an antenna generating at least one pattern null.

65. The system of claim 64, wherein said at least one antenna has a fixed null towards a satellite direction and comparatively high gain in the horizontal direction.

66. The system of claim 64, wherein said at least one antenna has sidelobe cancellation used to create the at least one pattern null.

67. The system of claim 65, wherein said at least one antenna comprises a plurality of elements and weighting control to create the at least one pattern null.

68. The system of claim 65, wherein said at least one antenna comprising a plurality of elements and at least one low gain element.

69. The system of claim 68, wherein said at least one antenna has an independent null in an interference direction and said at least one low gain element adds amplitudes and phases destructively.

70. The system of claim 68, wherein said at least one low gain element has multiple taps to produce nulls at multiple frequencies.

71. The system of claim 68, further comprising multiple low gain elements for wide band null creation.

72. The system of claim 65, further comprising means for dynamic adjustment of the at least one pattern null.

73. The system of claim 72, further comprising a table-look-up for dynamic adjustment of the at least one pattern null.

74. The system of claim 65, further comprising a closed loop feedback system employing a steepest descent search algorithm and a least-mean-square as the optimization criteria.

75. A method of operating a communication system comprising:
- in a satellite, producing downlink signals at a satellite downlink frequency and receiving uplink signals at a satellite uplink frequency;
- in a terrestrial terminal unit, producing a first signal at the satellite downlink frequency that is transmitted directly to a terrestrial cell site, and receiving a second signal at a satellite uplink frequency that was transmitted directly by a terrestrial cell site;
- in said terrestrial cell site, producing a third signal at the satellite uplink frequency that is transmitted directly to the terrestrial terminal unit, and receiving a fourth signal at the satellite downlink frequency that was transmitted by said terrestrial terminal unit.

76. The method of claim 75, wherein said fourth signal is said first signal.

77. The method of claim 75, wherein said third signal is said second signal.

78. The method of claim 75, wherein in said terrestrial cell site producing a fifth signal at the satellite uplink frequency that is transmitted to the satellite; and receiving a sixth signal at the satellite downlink frequency that was transmitted by the satellite.

79. The method of claim 75, wherein in said terrestrial terminal unit, producing a seventh signal at the satellite uplink frequency that is transmitted to the satellite; and receiving a sixth signal at the satellite downlink frequency that was transmitted by the satellite.

80. The method of claim 75, further comprising generating at least one pattern null.

81. The method of claim 80, wherein generating at least one pattern null further comprises generating a fixed null towards a satellite direction and a comparatively high gain in the horizontal direction.

82. The method of claim 80, wherein generating at least one pattern null comprises using a sidelobe cancellation technique.

83. The method of claim 80, wherein generating at least one pattern null comprises using weighting control of the signals from the antenna elements.

84. The method of claim 80, wherein generating at least one pattern null comprises using a nulling technique.

85. The method of claim 80, wherein said terrestrial cell site comprises an antenna, wherein generating at least one pattern null comprises adding at least one low gain element to the antenna.

86. The method of claim 85, wherein said at least one low gain element has multiple taps to produce nulls at multiple frequencies.

87. The method of claim 85, wherein generating at least one pattern null comprises creating an independent null in an interference direction and adjusting said at least one low gain element to add amplitudes and phases destructively.

88. The method of claim 85, wherein generating at least one pattern null comprises adding wide band nulls using multiple low gain elements.

89. The method of claim 80, wherein generating at least one pattern null includes dynamically adjusting the at least one pattern null.

90. The method of claim 89, wherein dynamically adjusting comprises dynamically adjusting the at least one pattern null using a table-look-up.

91. The method of claim 70, wherein using a table lookup comprises using said look-up table within a closed loop feedback system and employing a steepest descent search algorithm and a least-mean-square as an optimization criteria.

92. A method of operating a terrestrial terminal unit comprising:

producing a first signal at a satellite downlink frequency that is transmitted directly to a terrestrial cell site, and receiving a second signal at a satellite uplink frequency that was transmitted directly by said terrestrial cell site.

93. The method of claim 92, wherein said terrestrial terminal unit produces a third signal at the satellite uplink frequency that is transmitted to a satellite; and receiving a fourth signal at the satellite downlink frequency that was transmitted by the satellite.

94. A terrestrial terminal unit for use with a communication system having a terrestrial cell site, said terrestrial terminal unit adapted to produce a first signal at a satellite downlink frequency that is transmitted directly to the terrestrial cell site and receive a second signal at a satellite uplink frequency that was transmitted directly by said terrestrial cell site.

95. The terrestrial terminal unit of claim 94, wherein said terrestrial terminal unit produces a third signal at the satellite uplink frequency that is transmitted to a satellite; and said terrestrial terminal unit receives a fourth signal at the satellite downlink frequency that was transmitted by the satellite.

96. The terrestrial terminal unit of claim 94, further comprising at least one antenna.

97. The terrestrial terminal unit of claim 96, wherein said at least one antenna has a fixed null towards a satellite direction and comparatively high gain in the horizontal direction.

98. The terrestrial terminal unit of claim 96, wherein said at least one antenna has sidelobe cancellation used to create the at least one pattern null.

99. The terrestrial terminal unit of claim 98, wherein said at least one antenna comprises a plurality of elements and weighting control to create the at least one pattern null.

100. The terrestrial terminal unit of claim 96, further comprising at least one low gain element, said at least one antenna comprising a plurality of the elements and the at least one low gain element.

101. The terrestrial terminal unit of claim 100, wherein said at least one antenna has an independent null in an interference direction and said at least one low gain element adds amplitudes and phases destructively.

102. The terrestrial terminal unit of claim 100, wherein said at least one low gain element has multiple taps to produce nulls at multiple frequencies.

103. The terrestrial terminal unit of claim 100 further comprising multiple low gain elements for wide band null creation.

104. The terrestrial terminal unit of claim 96 further comprising means for dynamic adjustment of the at least one pattern null.

105. The terrestrial terminal unit of claim 96, further comprising a table-look-up for dynamic adjustment of the at least one pattern null.

106. The terrestrial terminal unit of claim 96, further comprising a closed loop feedback system employing a steepest descent search algorithm and a least-mean-square as an optimization criteria.

107. A method of operating a terrestrial cell site comprising:

producing a first signal at a satellite uplink frequency that is transmitted directly to a terrestrial terminal unit, and receiving a second signal at a satellite downlink frequency that was transmitted by said terrestrial terminal unit.

108. The method of claim 107, further comprising generating at least one pattern null with an antenna to reduce satellite interference.

109. The method of claim 108, wherein generating at least one pattern null further comprises generating a fixed null towards a satellite direction and a relatively high gain in the horizontal direction.

110. The method of claim 108, wherein generating at least one pattern null comprises utilizing a sidelobe cancellation technique.

111. The method of claim 108, wherein generating at least one pattern null comprises using weighting control of signals from antenna elements.

112. The method of claim 108, wherein generating at least one pattern null comprises using a nulling technique.

113. The method of claim 108, wherein said antenna comprises the antenna elements and wherein the step generating at least one pattern null comprises using at least one low gain element added to the antenna elements.

114. The method of claim 108, wherein generating at least one pattern null comprises creating an independent null in an interference direction and adjusting said at least one low gain element to add amplitudes and phases destructively.

115. The method of claim 108, wherein generating at least one pattern null comprises adding wide band nulls using multiple low gain elements.

116. The method of claim 115, wherein said at least one of said multiple low gain elements has multiple taps to produce nulls at multiple frequencies.

117. The method of claim 108, adding at least one pattern null includes dynamically adjusting the at least one pattern null.

118. The method of claim 117, wherein dynamically adjusting comprises dynamically adjusting the at least one pattern null using a table-look-up.

119. The method of claim 108, wherein using a table lookup comprises using said look-up table within a closed loop feedback system and employing a steepest descent search algorithm and a least-mean-square as the optimization criteria.

120. The method of claim 107, wherein in said terrestrial cell site, producing a third signal at the satellite uplink frequency that is transmitted to the satellite; and receiving a fourth signal at the satellite downlink frequency that was transmitted by the satellite.

121. A terrestrial cell site for use with a communication system having a terrestrial terminal unit, said terrestrial cell site adapted to produce a first signal at a satellite uplink frequency that is transmitted directly to a terrestrial terminal unit, and receive a second signal at a satellite downlink frequency that was transmitted by said terrestrial terminal unit.

122. The terrestrial cell site of claim 121, wherein said terrestrial cell site produces a third signal at the satellite uplink frequency that is transmitted to a satellite; and receives a fourth signal at the satellite downlink frequency that was transmitted by the satellite.

123. A two-way communication system comprising:

a satellite producing downlink signals at a satellite downlink frequency and receiving uplink signals at a satellite uplink frequency;

a terrestrial terminal unit;

a terrestrial cell site;

said terrestrial terminal unit producing a first signal at the satellite downlink frequency that is transmitted directly to said terrestrial cell site;

said terrestrial terminal unit receiving a second signal at a satellite uplink frequency that was transmitted directly by said terrestrial cell site;

said terrestrial cell site producing the second signal at the satellite uplink frequency that is transmitted directly to the terrestrial terminal unit; and said terrestrial cell site directly receiving the first signal at the satellite downlink frequency that was transmitted by said terrestrial terminal unit.

124. The system of claim 123 wherein the terrestrial cell site generates the uplink signals and receives the downlink signals.

125. The system of claim 123 wherein the terrestrial terminal unit generates the uplink signals and receives the downlink signals.

126. The system of claim 123 wherein a satellite user terminal generates the uplink signals and receives the downlink signals.

127. A method of operating a two-way communication system comprising:

in a satellite, producing downlink signals at a satellite downlink frequency and receiving uplink signals at a satellite uplink frequency;

in a terrestrial terminal unit, producing a first signal at the satellite downlink frequency that is transmitted directly to a terrestrial cell site, and receiving a second signal at a satellite uplink frequency that was transmitted directly by a terrestrial cell site;

in a terrestrial cell site, producing said second signal at the satellite uplink frequency that is transmitted directly to the terrestrial terminal unit, and receiving said first signal at the satellite downlink frequency that was transmitted by said terrestrial terminal unit.

128. The system of claim 127, wherein said terrestrial cell site produces a third signal at the satellite uplink frequency that is transmitted to the satellite; and receiving a fourth signal at the satellite downlink frequency that was transmitted by the satellite.

129. The system of claim 127, wherein said terrestrial terminal unit produces a seventh signal at the satellite uplink frequency that is transmitted to the satellite; and in said terrestrial terminal unit, receiving a sixth signal at the satellite downlink frequency that was transmitted by the satellite.

\* \* \* \* \*